Figure 1:
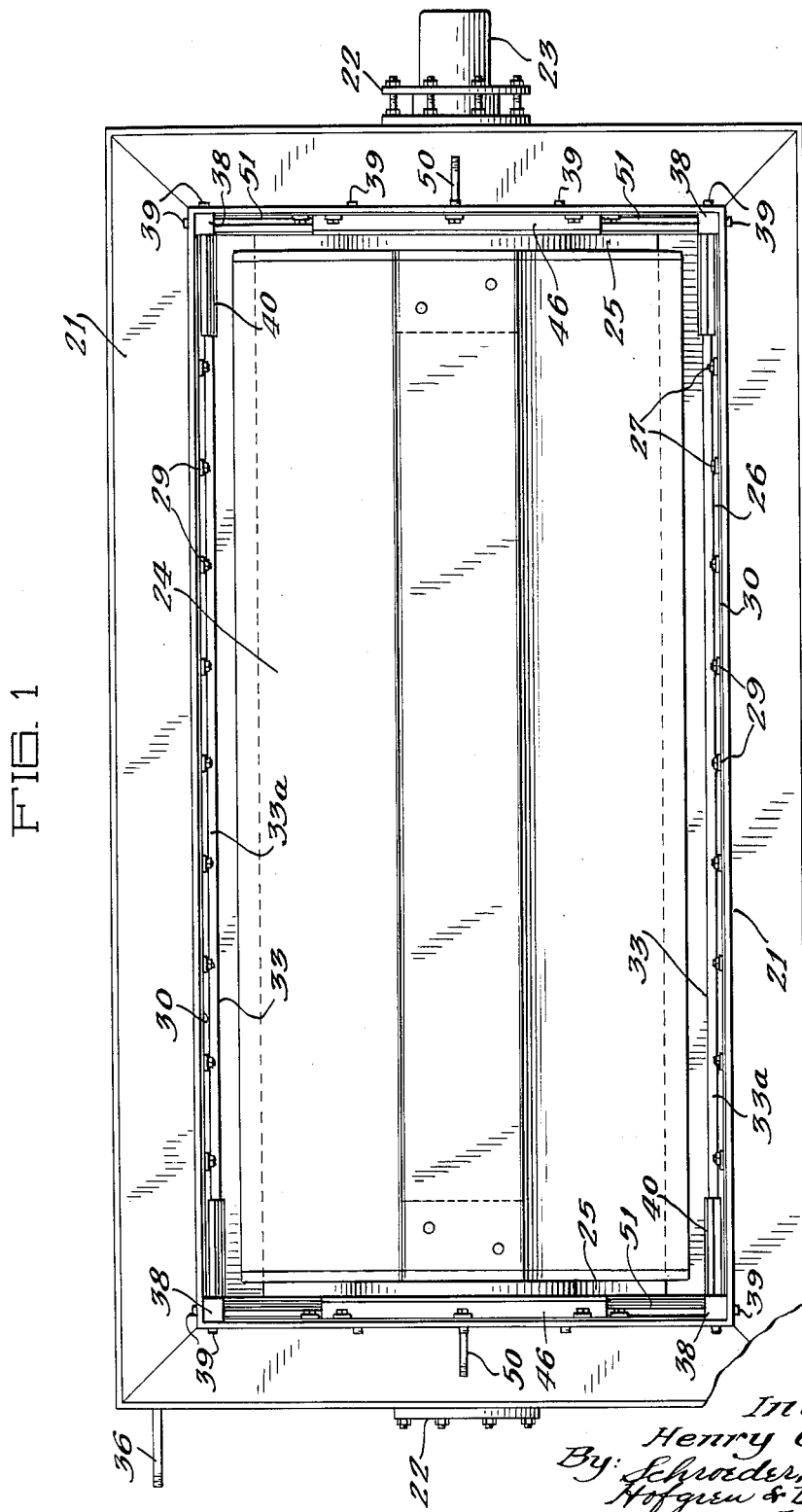

April 3, 1956 H. C. SCHWENK 2,740,605
STRESSED SEAL DAMPER
Filed Sept. 9, 1952 6 Sheets-Sheet 1

Inventor:
Henry C. Schwenk
By: Schroeder, Merriam,
Hofgren & Brady
Attorneys

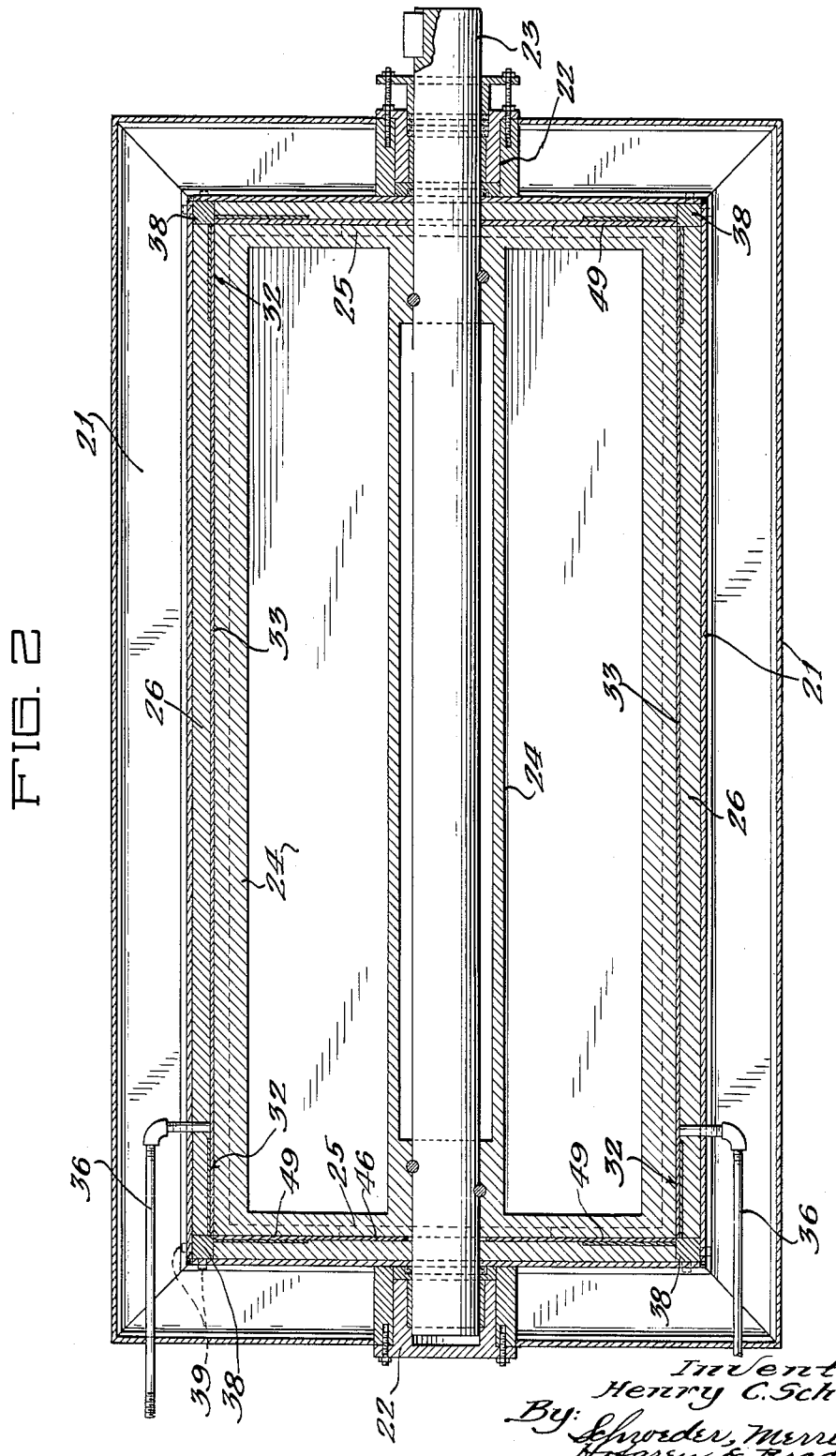

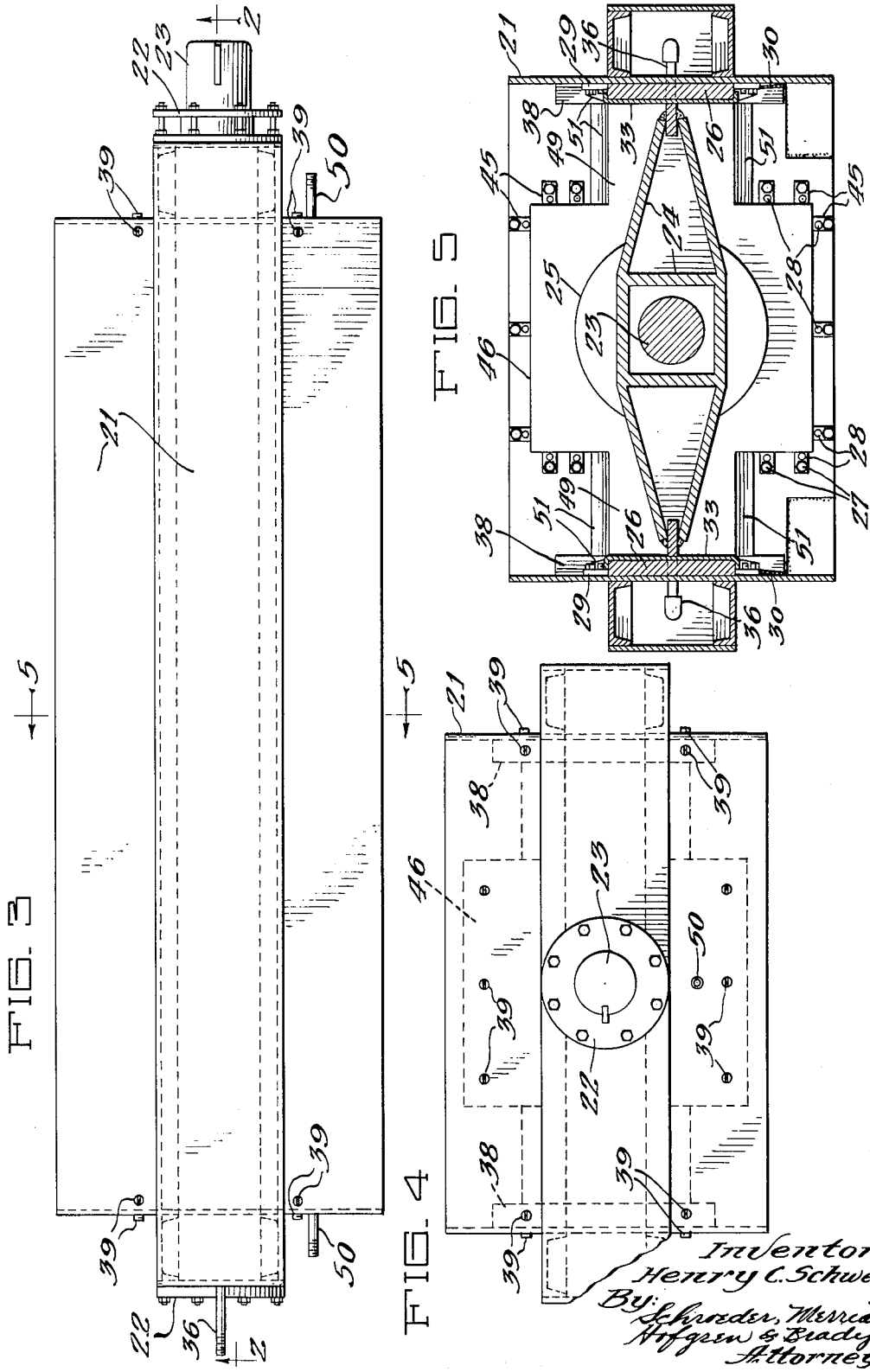

April 3, 1956  H. C. SCHWENK  2,740,605
STRESSED SEAL DAMPER
Filed Sept. 9, 1952  6 Sheets-Sheet 4
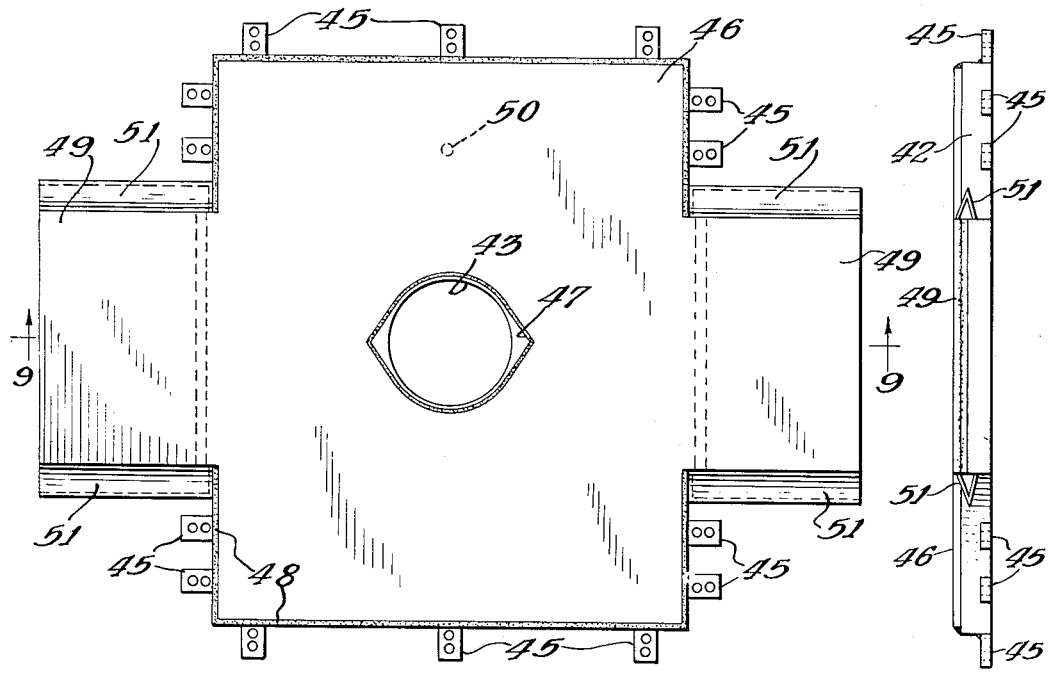
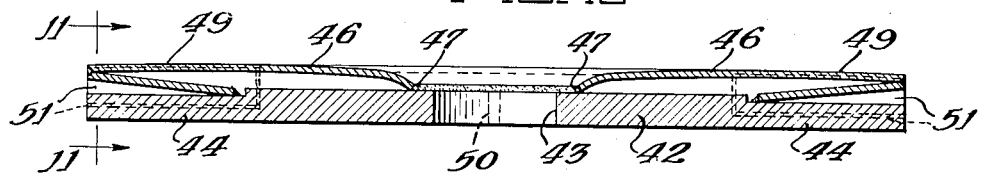
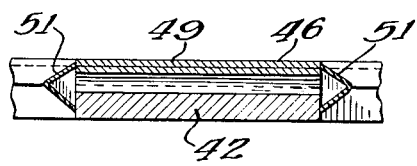
Inventor:
Henry C. Schwenk
By: Schroeder, Merriam,
Hofgren & Brady
Attorneys

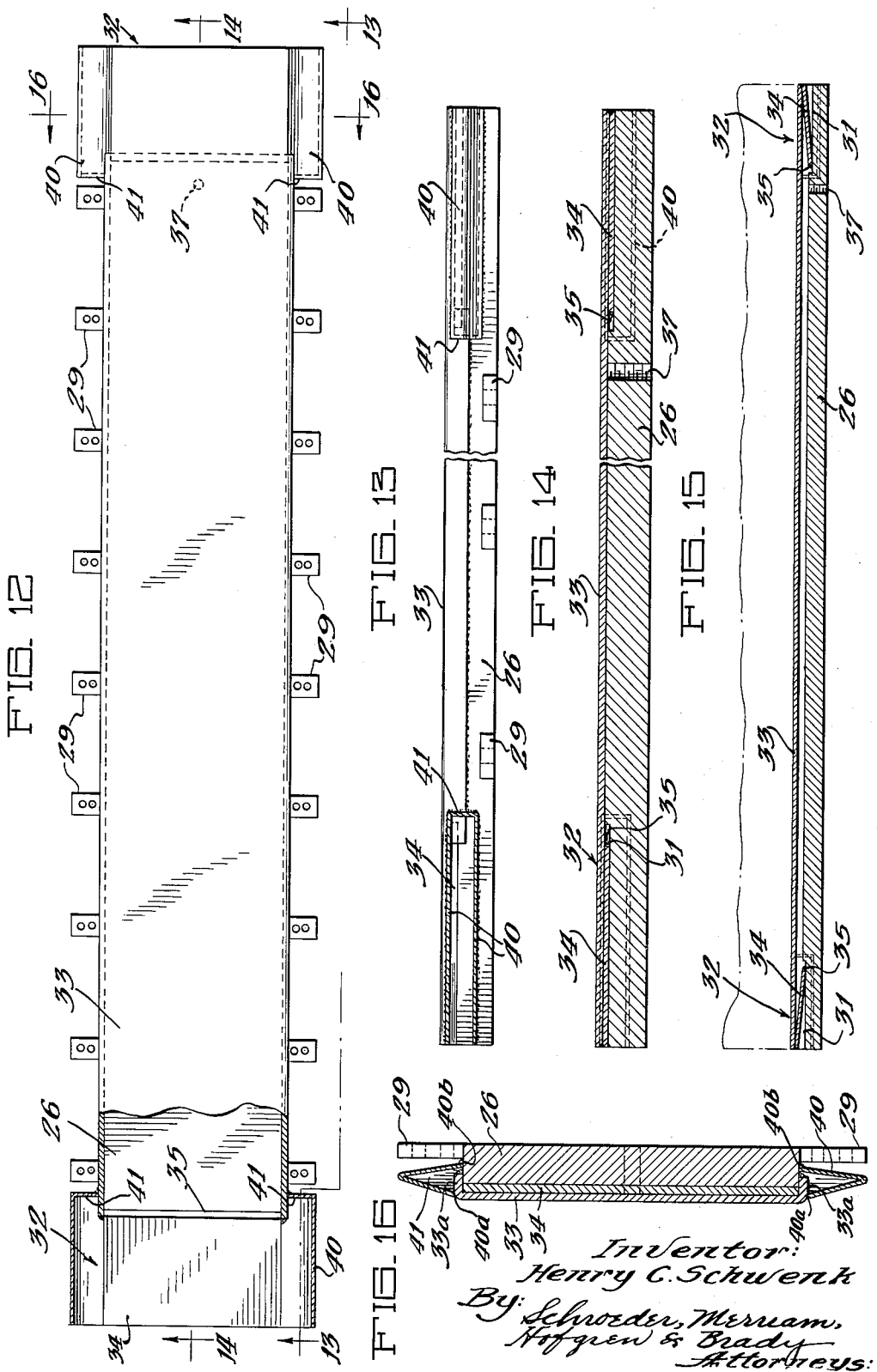

April 3, 1956 H. C. SCHWENK 2,740,605
STRESSED SEAL DAMPER
Filed Sept. 9, 1952 6 Sheets-Sheet 6
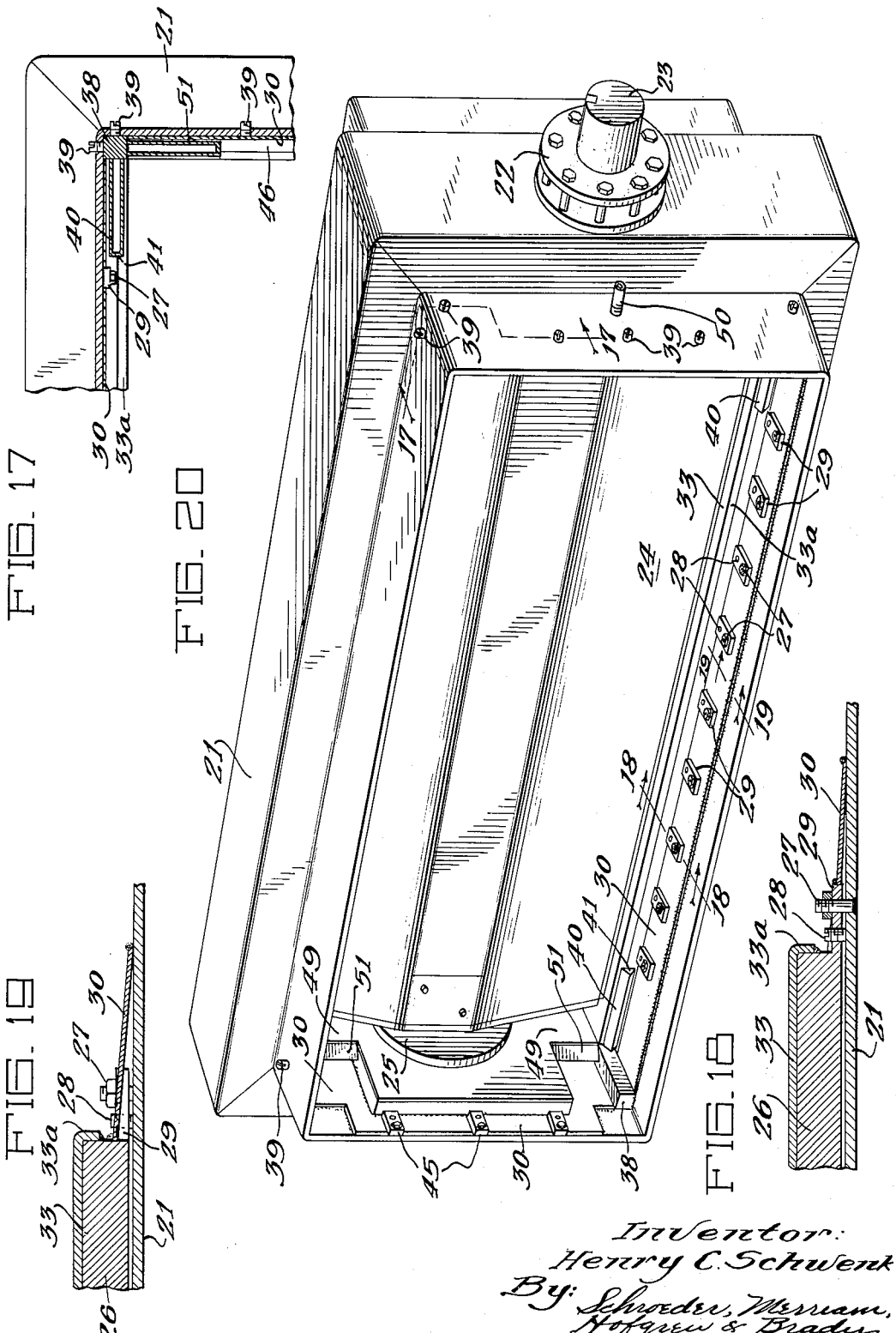

United States Patent Office 2,740,605
Patented Apr. 3, 1956

2,740,605

STRESSED SEAL DAMPER

Henry C. Schwenk, Chicago, Ill., assignor to Henry Pratt Company, a corporation of Illinois Application September 9, 1952, Serial No. 308,619

5 Claims. (Cl. 251—173)

This invention relates to dampers in which metal seats may be expanded by fluid pressure, after the louver blade is turned to closed position.

The primary object of the invention is to provide a damper having a metal frame and louver blade which are machined to very close tolerances, but sufficient to permit the blade to be turned, and to allow for expansion of the louver due to thermal shock. The frame has a metal seat which may be expanded by gas pressure to close the small perimetral clearance space after the blade is turned to closed position. The apparatus illustrated is of large size, having an opening of more than twenty square feet, and is capable of satisfactory operation in temperatures ranging from −20° F. to 650° F. The apparatus is is adapted for use in connection with wind tunnels for testing jet engines, and the like. In stressed seal dampers there has heretofore been difficulty in obtaining a tight seal at the square corner portions of the frame.

One of the objects of the present invention is to overcome this difficulty by providing cantilever supported pocket portions at the ends of the flexible metal sealing members to close the corner openings.

Another object of the invention is to provide metal tent-like members to reduce the leakage between the pocket portions of the sealing members and their backing plates.

The sealing members are of metal and must not be deformed beyond their elastic limit, which means that their movement is only a few ten thousandths of an inch. In order to stay within the necessary tolerances, it is desirable to have the backing members adjustable with respect to the frame after the apparatus is set up.

Another object of the invention is to provide a metal closure plate which is coextensive with the backing plate, and has its edges welded to the backing plate and an outer portion of the frame, so as to permit this adjustment to be made while maintaining a seal between the backing plate and the frame.

The invention is illustrated in a preferred embodiment in the accompanying drawings, in which—

Fig. 1 is a fragmentary plan view;

Fig. 2, a plan sectional view, taken as indicated at line 2—2 of Fig. 3;

Fig. 3, a side elevational view;

Fig. 4, a fragmentary end elevational view;

Fig. 5, a sectional view, taken as indicated at line 5—5 of Fig. 3;

Fig. 6, an end elevational view of one of the end sealing panels mounted on a backing plate;

Fig. 7, an end view of the device shown in Fig. 6;

Fig. 8, a side elevational view of the same;

Fig. 9, a sectional view, taken as indicated at line 9—9 of Fig. 6;

Fig. 10, a view similar to Fig. 9, showing the panel in exaggerated expanded position;

Fig. 11, a sectional view, taken as indicated at line 11—11 of Fig. 10;

Fig. 12, a fragmentary sectional view of one of the lateral metal sealing bands mounted on a backing plate;

Fig. 13, a fragmentary longitudinal sectional view, taken as indicated at line 13—13 of Fig. 12;

Fig. 14, a fragmentary longitudinal sectional view, taken as indicated at line 14—14 of Fig. 12;

Fig. 15, a view similar to Fig. 14, but showing the sealing band in exaggerated expanded position;

Fig. 16, a sectional view, taken as indicated at line 16—16 of Fig. 12;

Fig. 17, a fragmentary enlarged plan sectional view of one of the corners of the frame;

Fig. 18, a fragmentary sectional view, taken as indicated at line 18—18 of Fig. 20;

Fig. 19, a fragmentary sectional view, taken as indicated at line 19—19 of Fig. 20; and Fig. 20, a perspective view of the assembled apparatus.

In the embodiment illustrated, a rectangular frame 21 is made of channel iron, and is provided at opposite ends with bearings 22 for a shaft 23 on which is mounted a louver blade 24, provided with end plates 25. A pair of backing plates 26 are adjustably secured to the inside of the frame, as shown in Figs. 18–20, by means of bolts 27 and set screws 28 extending through lateral tabs 29. A metal flexible closure plate 30, as best shown in Figs. 18 and 19, is welded to the edge of the backing plate, and the outer portion of the frame, to prevent leakage behind the backing plate while allowing flexibility for adjustment.

As shown in Figs. 14 and 15, cut-out portions 31 are provided to receive the pocket-like end portions 32 of the metal sealing band 33. The pockets are formed by welding the lower inner edge of a plate 34 to the backing plate, as indicated at 35. The outer edge of the plate 34 is welded to the end of the band 33, and the lateral edges 33a of the band 33 are welded to the backing plate up to the inner edge of the plate 34, and from that point outwardly they are welded to the lateral edges of the plate 34, so as to form a closed chamber or pocket which communicates with the closed chamber between the band 33 and the plate 26.

A pressure line 36 communicates with this chamber through an opening 37, so that when fluid pressure is introduced the sealing band is urged upwardly into contact with the louver blade, as indicated in Fig. 15. The pockets 32 afford floating ends for the sealing band and a tight seal against the blade is provided along the full length of the backing plate.

As will be seen in Fig. 15, when the pocket portions of the sealing strip move upwardly, a small triangular space opens up between the plate 34 and its seat in the cut-out portion of the backing plate. In order to prevent leakage at this point, square posts 38 are provided in each corner of the frame. After these posts have been adjusted in proper position by means of set screws 39 they are welded permanently in their adjusted position. Special members 40 are provided to close the openings. These metal members are preferably shaped like a miniature shelter-tent having one edge welded to the sealing band 33, as indicated at 40a in Fig. 16, and the other edge welded to the backing plate 26, as indicated at 40b. The tent-like member has an open end which abuts tightly against one face of the post 38. The opposite end is closed, as indicated at 41, and has its base welded to the edge 33a of the sealing strip and the edge of the backing plate 26. Although the member 40 is of metal, it is sufficiently flexible to permit the floating ends of the pocket member to move a few thousandths of an inch and keep the underlying space closed.

In order to provide proper sealing for the ends of the louver blade, each end of the frame is provided with a special backing plate 42, as shown in Figs. 5–11. The plates have openings 43 through which the shaft 23 extends. The backing plate 42 has arms 44 with cut-out portions to accommodate pocket portions similar to those on the backing plate 26. The plate also has tabs 45 for adjustably securing it to the end of the frame.

A metal sealing panel 46 extends over the backing plate 42, and has its edge portions welded to the plate around the shaft opening, as indicated at 47, and also has its edge portions welded to the plate, as indicated at 48. Pocket members 49 are provided on the panel, and operate in substantially the same way as pockets 32 on the longitudinal backing plate. Connections with the high pressure fluid line 50 cause the metal panel to expand upwardly to form a tight seal against end plates 25, as shown in Fig. 10. Tent-like members 51 are similar to the members 40, and abut against the corner posts 38.

In operation, the louver blade is turned to closed position by the shaft 23, and fluid under high pressure is introduced beneath the sealing bands and sealing panels. This causes them to move into engagement with the blade and provide a tight seal. The floating pocket portion makes the seal effective clear to the corners of the frame, and the tent-like members prevent leakage between the backing plate and the pocket portion.

The foregoing detailed description is given for clearness of understanding only, and no unnecessary limitations should be understood therefrom, for some modifications will be obvious to those skilled in the art.

I claim:

1. A stressed seal damper comprising: a rectangular frame provided with bearings at opposite ends; a shaft journalled in said bearings and provided with a louver blade which may be turned by the shaft to close the opening in said frame; a pair of backing plates secured to inner opposite sides of the frame around said opening, said plates having cut-out portions adjacent each corner of the frame; metal sealing bands for contact with the edges of said louver blade, said bands covering said backing plates and being provided at each end with pocket portions each of which are formed in part by an extension of one of the sealing bands which extends to the edge of the cut-out portion adjacent each corner of the frame, each of said pocket portions fitting into one of said cut-out portions, the lower inner edge of each of said pocket portions being welded to one of the backing plates to permit limited movement of the outer end of each pocket portion, the edge portions of said sealing bands between the pocket portions being welded to the backing plates so as to form closed chambers communicating with the inside of said pocket portions; a flexible member to effect sealing between each pocket portion and its adjacent cut-out portion during said limited movement of the pocket portion; and a pressure line connected to said chambers whereby fluid may be introduced to expand the sealing bands and their pocket portions into sealing contact with the edges of the closed louver blade.

2. Apparatus as specified in claim 1, in which the louver blade is provided with end plates, a second pair of backing plates with shaft openings are secured to inner opposite ends of the frame and have arms with cut-out portions adjacent each corner of the frame, metal sealing panels for contact with the edges of said louver blade cover said second pair of backing plates, each of said panels being provided with a pair of closed pocket portions each of which are formed in part by an extension of one of the sealing panels which extends to the edge of the cut-out portion in one of the arms adjacent each corner of the frame, each of said pocket portions fitting into one of said cut-out portions with the lower inner edge of each pocket portion being welded to one of said second pair of backing plates to permit limited movement of the outer end of each pocket portion, the edge portions of each of the panels between the pocket portions and around the shaft opening being welded to the adjacent backing plate of said second pair of backing plates so as to form a closed chamber communicating with the inside of said pocket portions; a flexible member to effect sealing between each pocket portion and its adjacent cut-out portion in the second pair of backing plates during said limited movement of the outer end of each pocket portion; and connections between the pressure line and said chambers to expand said panels and their pocket portions into sealing contact with the end plates of the louver blade.

3. Apparatus as specified in claim 2, in which a rectangular post is provided in each corner of the frame abutting ends of both pairs of backing plates, and the flexible sealing member comprise flexible tent-like members which close the openings between the pocket portions and backing plates occurring during said limited movement of the outer end of said portions, said members having one edge welded to the pocket portion and another edge welded to the adjacent backing plate to permit limited yieldable movement with the outer ends of said pocket portions, said members each having an open end portion in abutment with one of said posts and a closed end beyond the pocket portion welded to the sealing member and backing plate.

4. Apparatus as specified in claim 1, in which one of the backing plates is mounted adjacent one inner side of the frame for limited movement toward an edge of the louver blade in closed position, adjusting means are provided for regulating the amount of said backing plate movement, and a metal closure plate is positioned adjacent said one backing plate, said closure plate being welded to the edge of said one backing plate and to an outer portion of the frame to permit sealed adjustment of said one backing plate.

5. Apparatus as specified in claim 2, in which the flexible sealing members comprise flexible tent-like members having one edge welded to the pocket portion and another edge welded to the adjacent backing plate, said members having an open end portion in abutment with a corner of the frame and a closed end beyond the pocket portion welded to the sealing band and backing plate.

References Cited in the file of this patent

UNITED STATES PATENTS

| | | |
|---|---|---|
| 1,834,870 | Rogers | Dec. 1, 1931 |
| 1,844,641 | DeWein | Feb. 9, 1932 |
| 1,868,147 | Kruse | July 19, 1932 |
| 1,990,309 | Phillips | Feb. 5, 1935 |
| 2,488,380 | Danks | Nov. 15, 1949 |
| 2,489,915 | Loewenheim | Nov. 29, 1949 |
| 2,507,360 | Wicks | May 9, 1950 |